US008265047B2

(12) United States Patent
Qin et al.

(10) Patent No.: US 8,265,047 B2
(45) Date of Patent: Sep. 11, 2012

(54) SYSTEM AND METHOD FOR DEVICE DISCOVERY IN A WIRELESS NETWORK OF DEVICES HAVING DIRECTIONAL ANTENNAS

(75) Inventors: Xiangping Qin, San Jose, CA (US); Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 777 days.

(21) Appl. No.: 12/188,954

(22) Filed: Aug. 8, 2008

(65) Prior Publication Data

US 2009/0073942 A1    Mar. 19, 2009

Related U.S. Application Data

(60) Provisional application No. 60/972,184, filed on Sep. 13, 2007.

(51) Int. Cl.
*H04W 4/02* (2009.01)
(52) U.S. Cl. .......................... 370/338; 370/400
(58) Field of Classification Search .................. None
See application file for complete search history.

(56) References Cited

U.S. PATENT DOCUMENTS

| | | | |
|---|---|---|---|
| 4,644,532 A * | 2/1987 | George et al. ................ | 370/255 |
| 6,055,429 A | 4/2000 | Lynch | |
| 6,307,843 B1 * | 10/2001 | Okanoue ....................... | 370/312 |
| 7,385,960 B2 | 6/2008 | Bansal et al. | |
| 7,397,785 B2 * | 7/2008 | Wu et al. ...................... | 370/350 |
| 7,545,771 B2 | 6/2009 | Wentink et al. | |
| 7,664,054 B2 * | 2/2010 | Adya et al. ................... | 370/255 |
| 2003/0053437 A1 * | 3/2003 | Bahl et al. ................... | 370/345 |
| 2004/0072579 A1 | 4/2004 | Hottinen | |
| 2004/0185783 A1 | 9/2004 | Okawa et al. | |
| 2005/0285803 A1 | 12/2005 | Iacono et al. | |
| 2006/0156009 A1 | 7/2006 | Shin et al. | |
| 2006/0215628 A1 | 9/2006 | Olariu et al. | |
| 2007/0099668 A1 | 5/2007 | Sadri et al. | |
| 2008/0095072 A1 | 4/2008 | Shao et al. | |

(Continued)

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner* — Kwang B Yao
*Assistant Examiner* — Alex Skripnikov
(74) *Attorney, Agent, or Firm* — Kenneth L. Sherman, Esq.; Michael Zarrabian, Esq.; Sherman & Zarrabian LLP

(57) ABSTRACT

A system and method for wireless communication are disclosed. One aspect of the system includes a plurality of wireless devices forming a wireless network. The plurality of wireless devices are configured to wirelessly communicate with one another. Each of the wireless devices includes a device table including a list of one or more of the wireless devices and the directions of the one or more of the wireless devices with respect to the wireless device including the device table. In the wireless system, any one of the plurality of wireless devices is configured to perform device discovery directly with a new wireless device entering the wireless network. The one wireless device is further configured to update the device table therein and to transmit the updated device table to other wireless devices in the wireless network. Other devices in the wireless system can update their device tables, based at least partly on the updated device table without performing device discovery directly with the new wireless device.

36 Claims, 14 Drawing Sheets

U.S. PATENT DOCUMENTS

2011/0110265 A1      5/2011    Shao et al.

OTHER PUBLICATIONS

Hachman, "CE Giants back Amimon's Wireless HDTV Tech," online: www.pcmag.com, 1 page, Jul. 23, 2008.
Hitachi et al., High-Definition Multimedia Interface (HDMI) Specifications version 1.2, Aug. 22, 2005, pp. 1-214.
IEEE 802.15.3 Working Group. Part 15.3: Wireless medium access control (MAC) and physical layer (PHY) specifications for high rate wireless personal area networks (WPANs). IEEE Draft Standard, Draft P802.15.3/D16, Sep. 2003, pp. 1-324.
LG Electronics Inc., WirelessHD Specification Version 1.0 Overview, Oct. 9, 2007, 77 pages.
NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).
Qin et al., "Cooperative Automatic Device Discovery for Wireless Networks with Directional Antennas", Sep. 2007.
Van Veen et al., Beamforming: A Versatile Approach to Spatial Filtering, IEEE ASSP Magazine, Apr. 1988, 5: 4-24.
Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.
U. S. Office Action dated Aug. 19, 2010 in U.S. Appl. No. 11/801,601, filed May 10, 2007.
Bahl et al., "RADAR: an in-building RF-based user location and tracking system," Nineteenth Annual Joint Conference of the IEEE Computer and Communications Societies Proceedings, vol. 2, pp. 775-784 (Mar. 26-30, 2000).
Cover et al., "Capacity Theorems for the Relay Channel," IEEE Trans. Info. Theory, vol. 25, No. 5, p. 57284 (Sep. 1979).
Dabek et al., "Vivaldi: A Decentralized Network Coordinate System," SIGCOMM '04, Portland, Oregon, USA (Aug. 2004).
Multiband OFDM Alliance (MBOA) "Distributed Media Access Control (MAC) for Wireless Networks," (Nov. 1, 2005).
Standard ECMA-387 High Rate 60 GHz PHY, MAC and HDMI PAL (Dec. 2008).
Jose et al., "MAC layer issues and challenges of using smart antennas with 802.11," Technology Conference, 2003, VTC 2003-Fall, 2003 IEEE 58$^{th}$ vol. 5, pp. 3169-3173 (Oct. 6-9, 2003).
Kardos et al., "Performance of a new device discovery and link establishment protocol for Bluetooth," Global Telecommunications Conference, vol. 6, p. 5 (Nov. 28-Dec. 2, 2005).
Niculescu et al., "Ad hoc positioning system (APS) using AOA," 22$^{ND}$ Annual Joint Conference of the IEEE Computer and Communications Societies, vol. 3, pp. 1734-1743 (Mar. 30-Apr. 3, 2003).
Nosratinia et al., "Cooperative communication I wireless networks," *Communication Magazine*, vol. 42, Issue 10, pp. 74-80 (Oct. 2004).
Ostmark et al., "Service and device discovery of nodes in a wireless sensor network," Consumer Communications and Networking conference, 2006 3$^{rd}$ IEEE, vol. 1, 8-10, pp. 218-222 (Oct. 2006).
Petrioli et al., "Degree-constrained multihop scatternet formation for Bluetooth networks," Global Telecommunications Conference, vol. 1, pp. 222-226 (Nov. 17-21, 2002).
Shih et al., "Distributed direction-based localization in wireless sensor networks," Computers and Communications, 10$^{th}$ IEEE Symposium on ISCC 2005, pp. 373-378 (Jun. 27-30, 2005).
Zaruba et al., "Simplified Bluetooth device discovery—analysis and simulation," System Sciences, Proceedings of the 37$^{th}$ Annual Hawaii International Conference, p. 9 (Jan. 5-8, 2004).
Zhang et al., "Evaluation and accelerating Bluetooth device discovery," Radio and Wire Symposium 2006 IEEE, pp. 467-470 (Jan. 17-19, 2006).
U.S. Restriction Requirement for U.S. Appl. No. 11/801,601 mailed on May 3, 2010.
U.S. Final Office Action for U.S. Appl. No. 11/801,601 mailed on Dec. 10, 2010.
U.S. Non-final Office Action for U.S. Appl. No. 13/007,308 mailed on Nov. 14, 2011.
U.S. Final Office Action for U.S. Appl. No. 13/007,308 mailed on Feb. 22, 2012.
U.S. Notice of Allowance for U.S. Appl. No. 11/801,601 mailed on Mar. 22, 2012.
U.S. Advisory Action for U.S. Appl. No. 13/007,308 mailed on May 10, 2012.

\* cited by examiner

SYSTEM AND METHOD FOR DEVICE DISCOVERY IN A WIRELESS NETWORK OF DEVICES HAVING DIRECTIONAL ANTENNAS

RELATED APPLICATION

This application claims priority from U.S. Provisional Patent Application No. 60/972,184, filed on Sep. 13, 2007, which is incorporated herein by reference.

BACKGROUND OF THE INVENTION

1. Field of the Invention

The present invention relates to wireless networks, and in particular, to device discovery in a wireless network.

2. Description of the Related Technology

A wireless network typically includes a plurality of wireless devices that can wirelessly communicate with one another. When two wireless devices in such a network communicate with each other, the wireless devices may perform device discovery to locate each other, and then start transmission of data and/or control signals. While the data transmission rate of the devices typically controls the overall performance of the network, the efficiency of the device discovery may also affect the performance of the network.

In many instances, at least one of wireless devices in a wireless network can be mobile. In other instances, a new device can enter an existing wireless network. In these instances, the devices in the network may need to discover the mobile device or the new device for wireless communication. With certain wireless devices, a device discovery process for a mobile or new device can be time-consuming due to the design of the antenna systems of the wireless devices. Thus, there is a need for providing an effective device discovery process to enhance the performance of a wireless network.

SUMMARY OF CERTAIN INVENTIVE ASPECTS

One inventive aspect is a method of device discovery for a wireless network including a plurality of wireless devices. The method comprises: determining, by a first wireless device in the wireless network, the direction of a second wireless device with respect to the first wireless device; updating, by the first wireless device, a first device table with the determined direction of the second wireless device, the first device table containing a list of the wireless devices in the wireless network and the directions of the wireless devices with respect to the first wireless device; and transmitting, by the first wireless device, the updated first device table over the wireless network.

Another inventive aspect is a method of co-operation of a wireless network including a plurality of wireless devices. The method comprises: receiving, by a second wireless device in the wireless network, a first device table generated by a first wireless device in the wireless network, the first device table containing a list of the wireless devices in the wireless network and the directions of the wireless devices with respect to the first wireless device; and updating, by the second wireless device, a second device table, based at least partly on the first device table, the second device table containing a list of the wireless devices in the wireless network and the directions of the wireless devices with respect to the second wireless device.

Yet another inventive aspect is a wireless device for use in a wireless network. The device comprises: a first device table including a list of wireless devices in a wireless network, and the directions of the wireless devices in the wireless network with respect to the first wireless device; wherein the wireless device is configured to determine the direction of another wireless device with respect to the wireless device; wherein the wireless device is further configured to update the first device table with the determined direction of the other wireless devices; and wherein the wireless device is further configured to transmit the updated first device table to at least one of the wireless devices in the wireless network.

Yet another inventive aspect is a wireless device for use in a wireless network. The device comprises: a first device table including a list of wireless devices in a wireless network, and the directions of the wireless devices in the wireless network with respect to the first wireless device; wherein the wireless device is configured to receive a second device table from another wireless device, the second device table including a list of the wireless devices in the wireless network and the directions of the wireless devices in the wireless network with respect to the second wireless device, and wherein the wireless device is further configured to update the first device table, based at least partially on the second device table.

Yet another inventive aspect is a wireless communication system. The system comprises: a plurality of wireless devices forming a wireless network, the plurality of wireless devices being configured to wirelessly communicate with one another, each of the wireless devices including a device table including a list of one or more of the wireless devices and the directions of the one or more of the wireless devices with respect to the wireless device including the device table, wherein any one of the plurality of wireless devices is configured to perform device discovery directly with a new wireless device entering the wireless network, wherein the one wireless device is further configured to update the device table therein and to transmit the updated device table to other wireless devices in the wireless network.

DETAILED DESCRIPTION OF CERTAIN INVENTIVE EMBODIMENTS

Figure 1A:
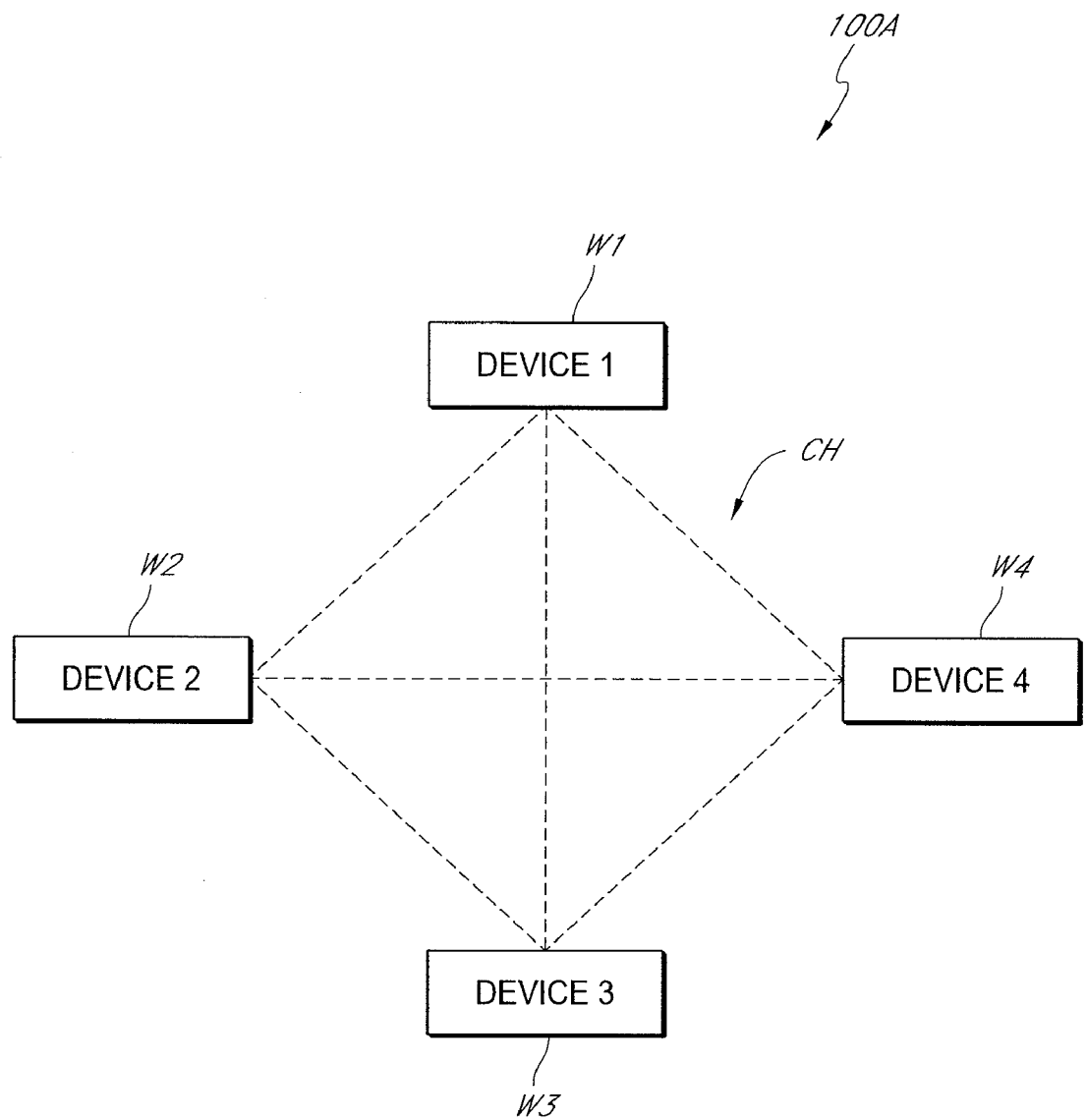
FIG. 1A is a block diagram of a conventional ad-hoc wireless network.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.
Overview of Wireless Systems Referring to FIG. 1A, a conventional ad-hoc wireless network will be described below. The illustrated network 100A includes first to fourth wireless devices W1-W4, but includes no coordinator. It will be appreciated that the network can include more wireless devices.

The first to fourth wireless device W1-W4 can communicate with one or more wireless channels CH. In some arrangements, one of the wireless devices W1-W4 can schedule a transmission time with another of the wireless devices, and conduct wireless transmission with the other wireless device during the scheduled transmission time. The wireless devices W1-W4 can perform a device discovery process to determine whether a new device has entered the network when one or more of the devices are idle or during a scheduled time period.

The wireless devices W1-W4 can be electronic devices that have wireless capability. Examples of such electronic devices include, but are not limited to, a mobile phone, a telephone, a television, a set-top box, a computer monitor, a computer, a hand-held computer, a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc.

The wireless devices W1-W4 can communicate with one another using a one-hop transmission scheme. In such an instance, one of the wireless devices (hereinafter, referred to as a "source device") sends signals directly to another wireless device (hereinafter, referred to as a "destination device") without using a third wireless device.

Figure 1B:
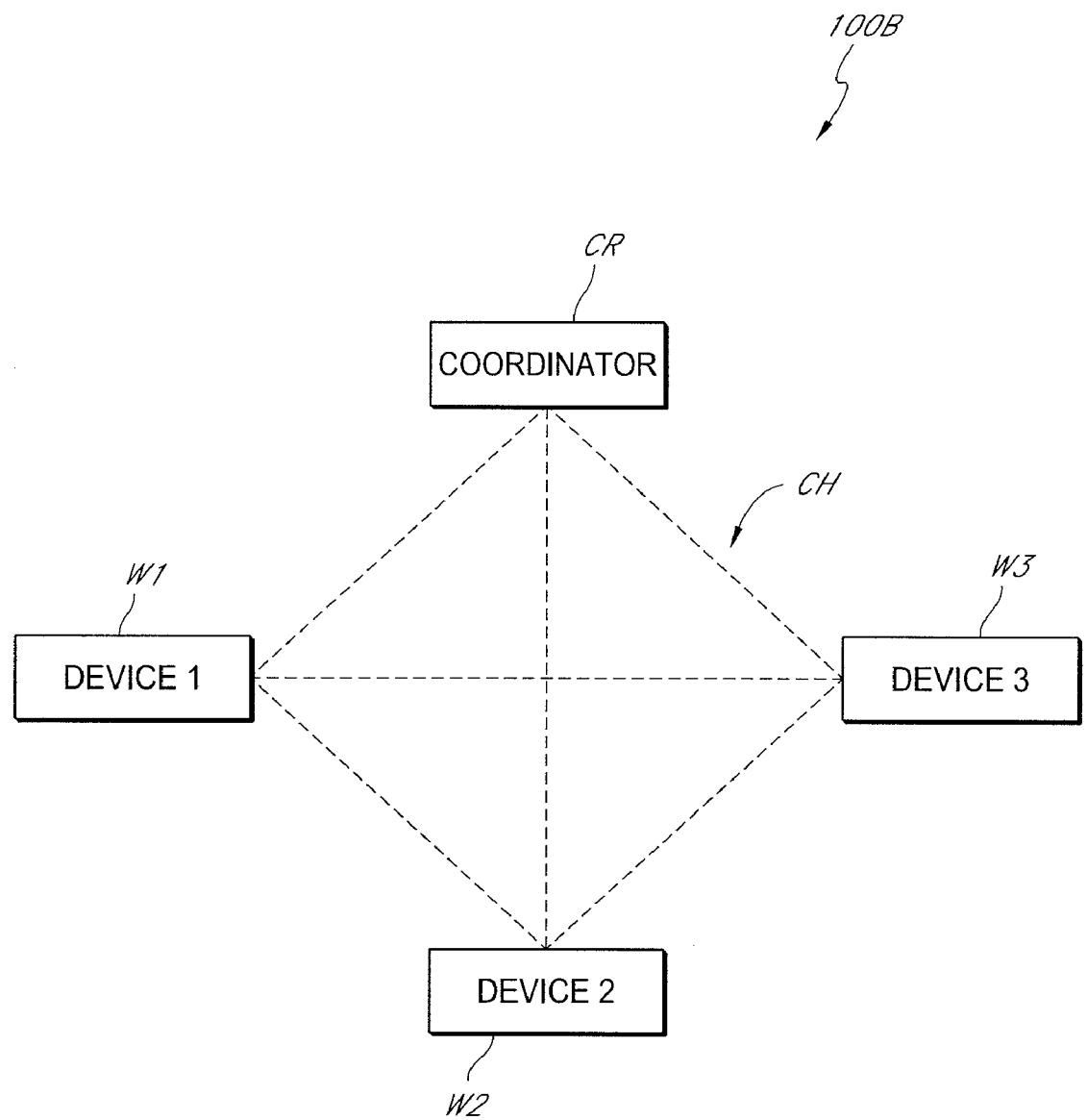
FIG. 1B is a block diagram of a conventional infrastructure wireless network.

Referring to FIG. 1B, a conventional infrastructure wireless network will be described below. The illustrated infrastructure wireless network 100B includes a coordinator CR and first to third wireless devices W1-W3. It will be appreciated that the network can include more wireless devices.

The coordinator CR serves to schedule transmission between two or more of the wireless devices W1-W3. In certain arrangements, the coordinator CR can transmit beacon signals to set one or more time frames for transmissions over the network. The coordinator CR may maintain information on the wireless network and the wireless devices W1-W3, and broadcast the information to the wireless device W1-W3. In certain arrangements, one of wireless devices in a wireless network can serve as a coordinator, instead of a dedicated coordinator. In some arrangements, the coordinator may be, for example, a television, a set-top box, a personal computer, a laptop computer, or a dedicated controlling box.

Figure 2:
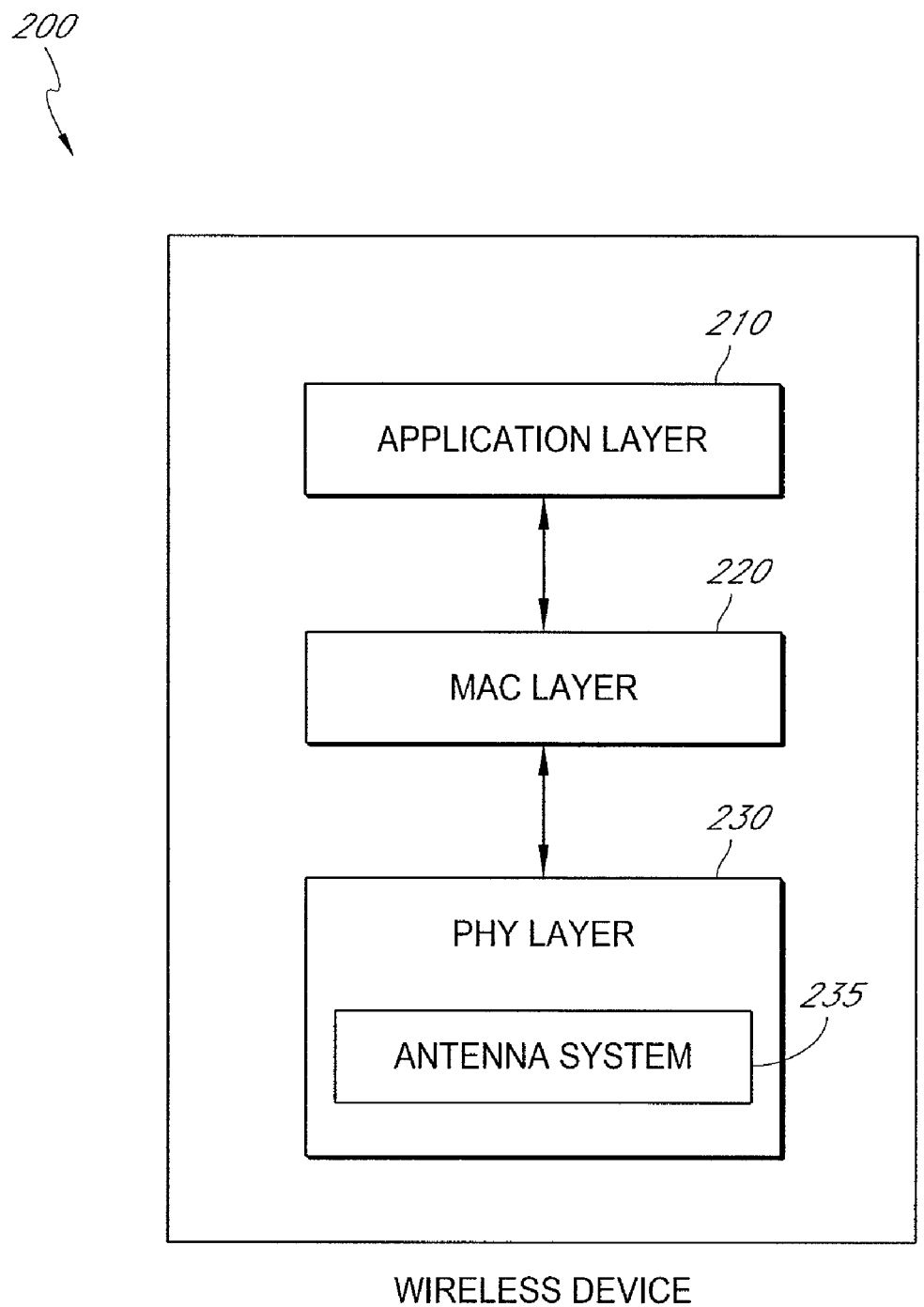
FIG. 2 is a block diagram of a conventional wireless device.

Referring to FIG. 2, an example configuration of a conventional wireless device for use in a wireless network will be described below. The wireless devices of FIGS. 1A and 1B and the coordinator of FIG. 1B may have the same configuration as that of the wireless device of FIG. 2. The illustrated wireless device 200 includes an application layer 210, a medium access control (MAC) layer 220, and a physical (PHY) layer 230.

The application layer 210 may include a data pre-processing module and a data control module. The data pre-processing module can perform pre-processing of data, such as partitioning of data. The data control module provides a standard way to exchange data handling information such as capability information. For example, before a connection begins, the data control module negotiates data formats to be used, and when the need for the connection is completed, data control commands are used to stop the connection.

The MAC layer 220 controls how the wireless device 200 gains access to data and permission to transmit it over the network. MAC layer 220 also serves to process data from the application layer 210 to form packets suitable for wireless transmission.

The PHY layer 230 serves to further process the data packets from the MAC layer 220, and send them over wireless channels. The PHY layer 230 can adds PHY headers to the data packets, and sends the packets via an antenna system 235 thereof.

The antenna system 235 may be capable of directional and/or omni-directional transmission and reception. In certain arrangements, the antenna system 235 may be directional, and can be a sector antenna system. The sector antenna system can have a plurality of antenna elements, each of which covers a selected angular range. An angular range covered by an antenna element can be referred to as a "sector." For example, a sector antenna system can have four antenna elements, each of which covers a sector of about 90°. In other arrangements, the antenna system 235 may be directional, and can include an antenna array for beam-forming. A skilled technologist will appreciate that various configurations of directional antenna systems can be adapted for the wireless device described above in connection with FIG. 2.
Device Discovery for Devices with Directional Antennas In certain arrangements, a wireless system includes wireless devices, at least one of which includes a directional antenna system. When two of the wireless devices communicate with each other, at least one of them needs to know the location or direction of the other device so that the device can adjust the direction of the antenna system for communication. A process for locating the other device (for example, determining the direction of the other device) can be referred to as a device discovery process.

Referring to FIGS. 3A-3D, a conventional device discovery process for wireless devices having directional antenna systems will be described below. In the illustrated example, each of a first device A and a second device B has a directional antenna system, such as a sector antenna system. In FIGS. 3A-3D, each of the sector antenna systems of the devices A, B has four antenna elements covering four sectors. A skilled technologist will appreciate that the sector antenna systems can have a different number of antenna elements covering a different number of sectors.

During a device discovery process, each of the first and second devices A, B, can only transmit or receive signals through one of the sectors during a period T. In addition, only when the sectors of the first device A and the second device B face each other, the devices A, B can discover each other. The devices A, B scan all the sectors around them in the following manner.

Figure 3A:
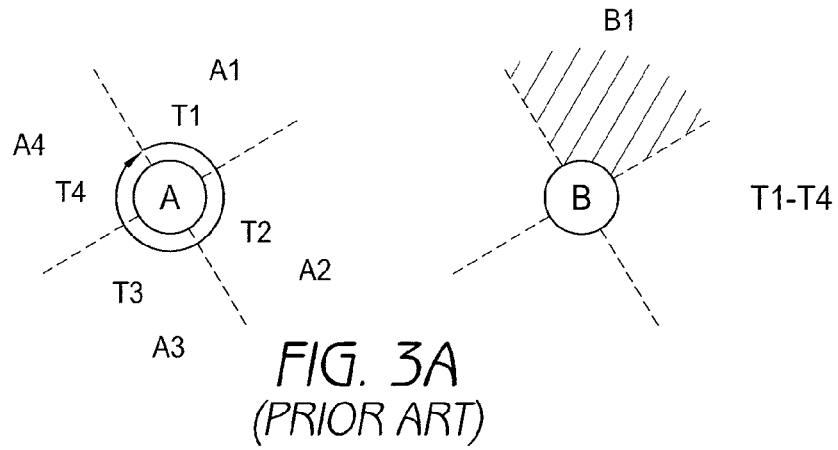
FIGS. 3A-3D illustrate a conventional device discovery process for wireless devices having directional antennas.

Referring to FIG. 3A, the first device A transmits signals through a selected sector of the first device A during each of first to fourth periods T1-T4. For example, during the first period T1, the first device transmits a signal through a first sector A1 of the first device A. During the second period T2, the first device transmits a signal through a second sector A2 of the first device A. During the third period T3, the first device transmits a signal through a third sector A3 of the first device A. During the fourth period T4, the first device transmits a signal through a fourth sector A4 of the first device A. In this manner, the first device A can scan the sectors A1-A4 for the periods T1-T4.

Figure 3B:
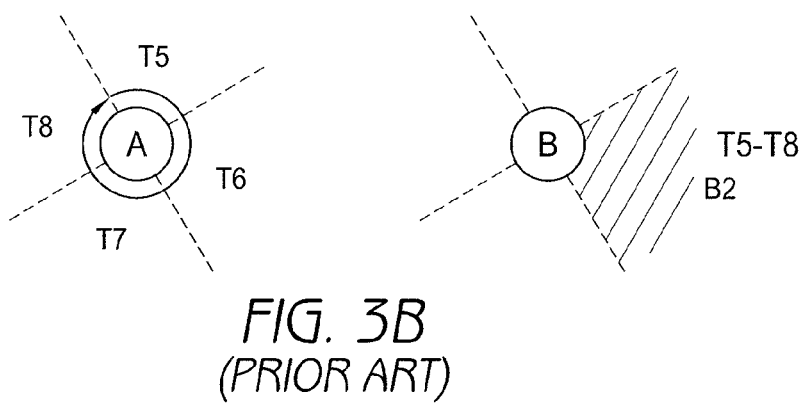
Figure 3C:
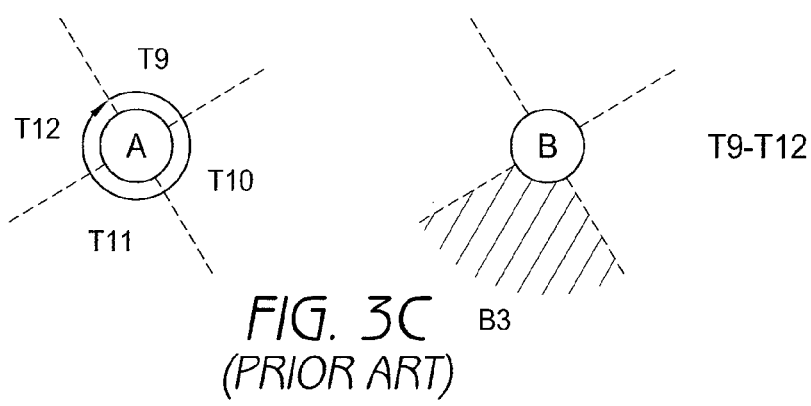
Figure 3D:
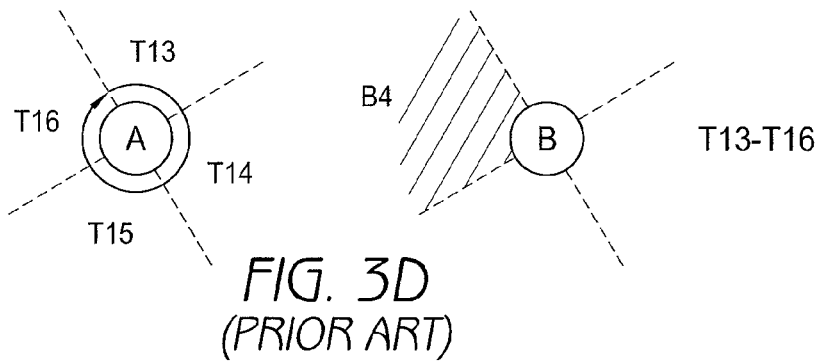

While the first device A scans the sectors A1-A4 for first to fourth periods T1-T4, the second device B can listen to a first sector B1 of the second device B. Subsequently, while the first device A scans the sectors A1-A4 for fifth to eighth periods T5-T8, the second device B can listen to a second sector B2 of the second device B, as shown in FIG. 3B. Then, while the first device A scans the sectors A1-A4 for ninth to twelfth periods T9-T12, the second device B can listen to a third sector B3 of the second device B, as shown in FIG. 3C. Finally, while the first device A scans the sectors A1-A4 for thirteenth to sixteenth periods T13-T16, the second device B can listen to a fourth sector B4 of the second device B, as shown in FIG. 3D. At a point in time during the first to sixteenth periods T1-T16, the devices can discover each other, and may terminate the device discovery process. In the illustrated example, an average duration (AD) for device discovery time is about a half of the sum of the first to sixteenth periods T1 to T16. The average duration (AD) can be represented by Equation 1.

$$\text{Average Duration } (AD) = \frac{1}{2} \sum_{i=1}^{16} T_i \quad \text{Equation 1}$$

Because all of wireless devices in a wireless network need to discover one another, as the number of the devices in the wireless network increases, the duration for device discovery increases. In addition, as the number of sectors of each device increases, the duration for device discovery increases. In a wireless network having many wireless devices, the duration for device discovery can be quite long, and may adversely affect the overall performance of the wireless network. Thus, there is a need for a scheme that can reduce device discovery time in a wireless network.

In one embodiment, a wireless network includes a plurality of wireless devices. The wireless network can be either an ad-hoc network or an infrastructure network. The wireless devices maintain device tables or device lists that include information on the devices in the network. The information can include the names and/or identifications (IDs) of some or all of the devices in the network, and the locations or directions of the devices.

When a new device enters the network, one or more of the devices existing in the network (hereinafter, referred to as "existing discovery device") performs device discovery with the new device, and updates and broadcasts its device table. Each of the other devices (hereinafter, referred to as "existing non-discovery device") can update their device tables by calculating the direction of the new device with respect to the existing non-discovery device, based at least partly on the device table sent from the discovery device. In some cases, the existing non-discovery devices do not have to perform device discovery directly with the new device. This scheme may be referred to as cooperative device discovery in the context of this document.

Figure 4A:
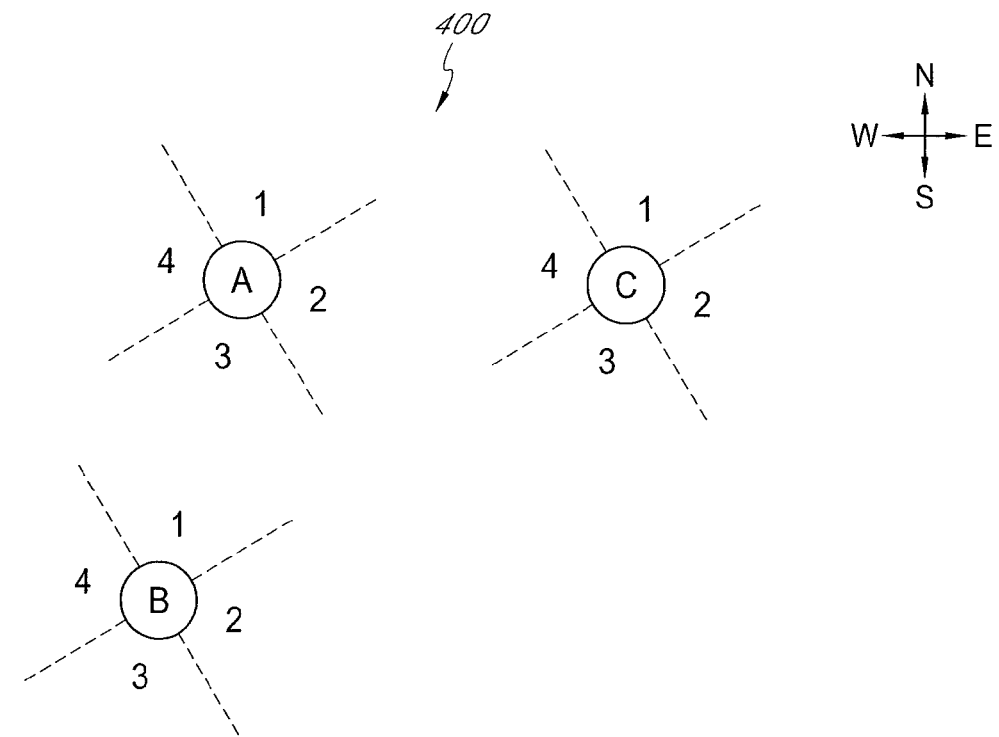
FIGS. 4A and 4B are diagrams illustrating a device discovery process according to one embodiment.
Figure 4B:
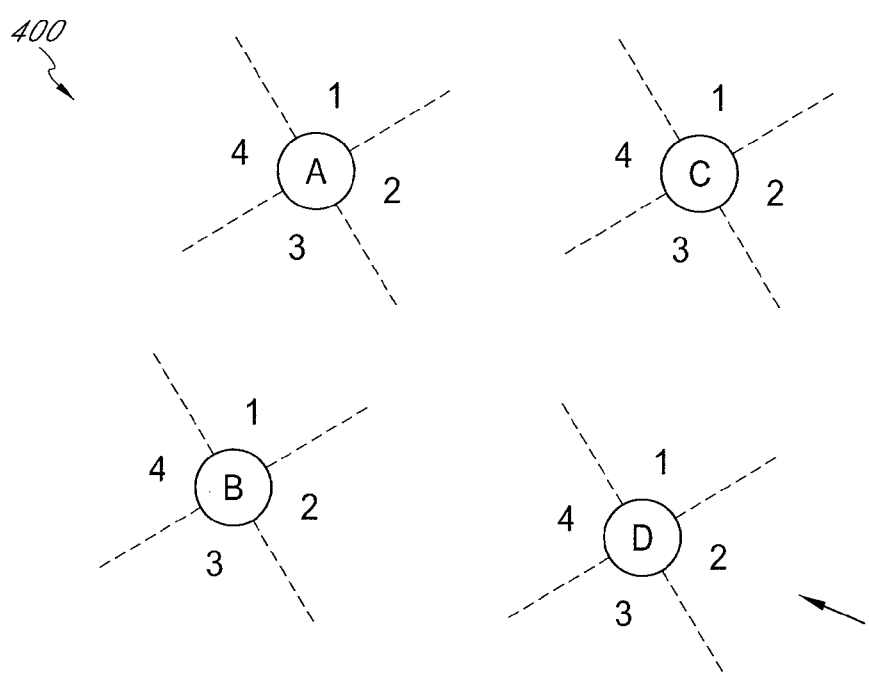

Referring to FIGS. 4A and 4B, one embodiment of a method of device discovery will be described below. FIG. 4A illustrates a one-hop ad-hoc network 400 that includes first to third wireless devices A-C. A skilled technologist will, however, appreciate that the embodiments described herein can be adapted for various configurations of wireless networks, not limited to a one-hop ad-hoc network. Each of the illustrated wireless devices A-C includes a sector antenna system having four antenna elements. In other embodiments, the wireless devices A-C can include other types of directional antenna systems.

The four antenna elements in combination cover all directions of a respective one of the wireless devices A-C. Each of the four antenna elements may cover a sector of about 90° without a substantial overlap with the other antenna elements. In FIG. 4A, each of the wireless devices A-C has four sectors around it with numbers 1-4 designated in an increasing order in a clockwise direction. Thus, each of the sectors of any of the wireless devices A-C covers a range of directions with respect to the wireless device.

The sectors of the devices A-C are numbered in the same manner such that identically numbered sectors of the devices indicate the same absolute direction. For example, the first sectors 1 of the devices A-C indicate the north direction N. Other configurations of the wireless devices A-C can be as described above in connection with FIGS. 1A, 1B, and 2.

In the illustrated embodiment, each of the wireless devices A-C maintains a device table listing some or all of the devices in the network 400. The term "device table" refers to a set of symbols (for example, numbers, letters, or alphanumeric numbers) representing certain information on devices on a network. The set of symbol can be arranged in a template of any suitable form, not limited to those described in the embodiments described below. In other embodiments, the set of symbols can be arranged without a template. In one embodiment, the first device A may have a device table shown in Table 1.

TABLE 1

| Version Number | Device Name | Sector |
|---|---|---|
| 0001 | A | 0 |
|  | B | 3 |
|  | C | 2 |

In Table 1, the version number indicates the version of the device table. The device name column lists the names or IDs of all the devices existing in the network 400. The sector column indicates a sector where a respective one of the devices is positioned with respect to the device that maintains the device table. In the illustrated embodiment, the first device A is the device that maintains the list, and the direction of the first device A can be represented by "0." This configuration allows the other devices to recognize that the device table belongs to the first device A. The second device B is positioned in the sector 3 of the first device A. The third device C is positioned in the sector 2 of the first device A. In other embodiments, the device table may omit the name or ID of the device which maintains the device table therein. In such embodiments, the device table may include information indicative of the device that maintains the device table.

Referring to FIG. 4B, a device discovery process for a new device will be described below. FIG. 4B illustrates a situation where a fourth device D enters the network 400 as a new device. The fourth device D may have the same configuration as the first to third devices A-C.

Upon entering an area covered by the network, at least one of the existing devices A-C and the fourth device D perform device discovery with each other. In one embodiment, one of the first to third devices A-C performs the device discovery directly with the fourth device D, and updates its device table. In the context of this document, an existing device that performs device discovery directly with a new device may be referred to as an "existing discovery device." An existing device that does not perform device discovery directly with a new device may be referred to as an "existing non-discovery device."

For example, the first device A may be an existing discovery device, and perform device discovery directly with the fourth device D. Then, the first device A may update its device table, and send the updated device table to the other existing non-discovery devices, that is, the second and third devices B, C. The second and third devices B, C may update their own device tables, based at least partly on the updated device table from the first device A. It will be understood that the other devices B, C can also be an existing discovery device. In other embodiments, two or more of the devices in the network can be existing discovery devices.

Figure 5:
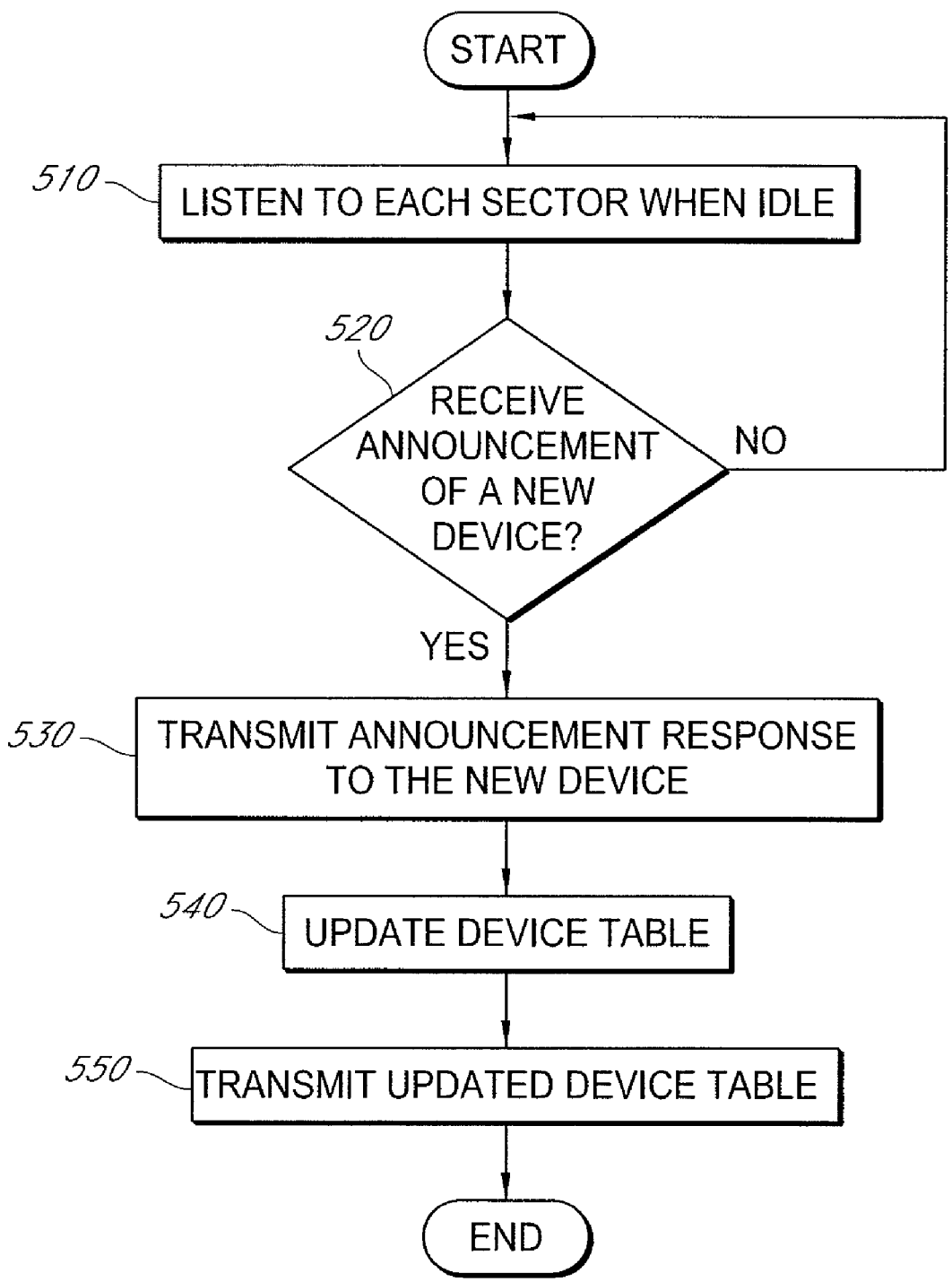
FIG. 5 is a flowchart illustrating a process for device discovery at an existing device in a wireless network according to one embodiment.

Referring to FIG. 5, one embodiment of a process performed by an existing discovery device will be described below. For example, among the first to third devices A-C of FIG. 4B, the first device A may be such an existing discovery device, and the process shown in FIG. 5 may take place at the first device A.

First, at block 510, the existing discovery device listens to each of its sectors when idle. The existing discovery device can listen to one of the sectors at a time during a selected time period. This can be performed in a manner similar to the process described above in connection with FIGS. 3A-3D.

At block 520, the existing discovery device determines whether it has received an announcement of a new device. If not, the process returns to block 510. If yes, the existing discovery device transmits an announcement response to the new device at block 530. The existing discovery device may send the response to the sector from which it has received the announcement of the new device.

At block 540, the existing discovery device may update its device table. For example, in FIG. 4B, the fourth device D (the new device) is positioned in the sector 2 of the first device A. Thus, the first device A of FIG. 4B can update its device table by adding the fourth device D and the sector 2 to the device table, as shown in Table 2. When updating the device table, the existing discovery device (e.g., the first device A in this example) can increase the version number. If there are multiple new devices discovered within a certain time frame, the version number will stay the same.

TABLE 2

| Version Number | Device Name | Sector |
|---|---|---|
| 0002 | A | 0 |
|  | B | 3 |
|  | C | 2 |
|  | D | 2 |

At block 550, the existing discovery device may send the updated device table to the other devices B-D. Upon receiving the updated device table from the existing discovery device, the other existing non-discovery devices can update their own device tables, as will be described below in connection with FIG. 7. The new device D may also update its own device table, based at least partly on the updated device table from the existing discovery device.

Figure 6:
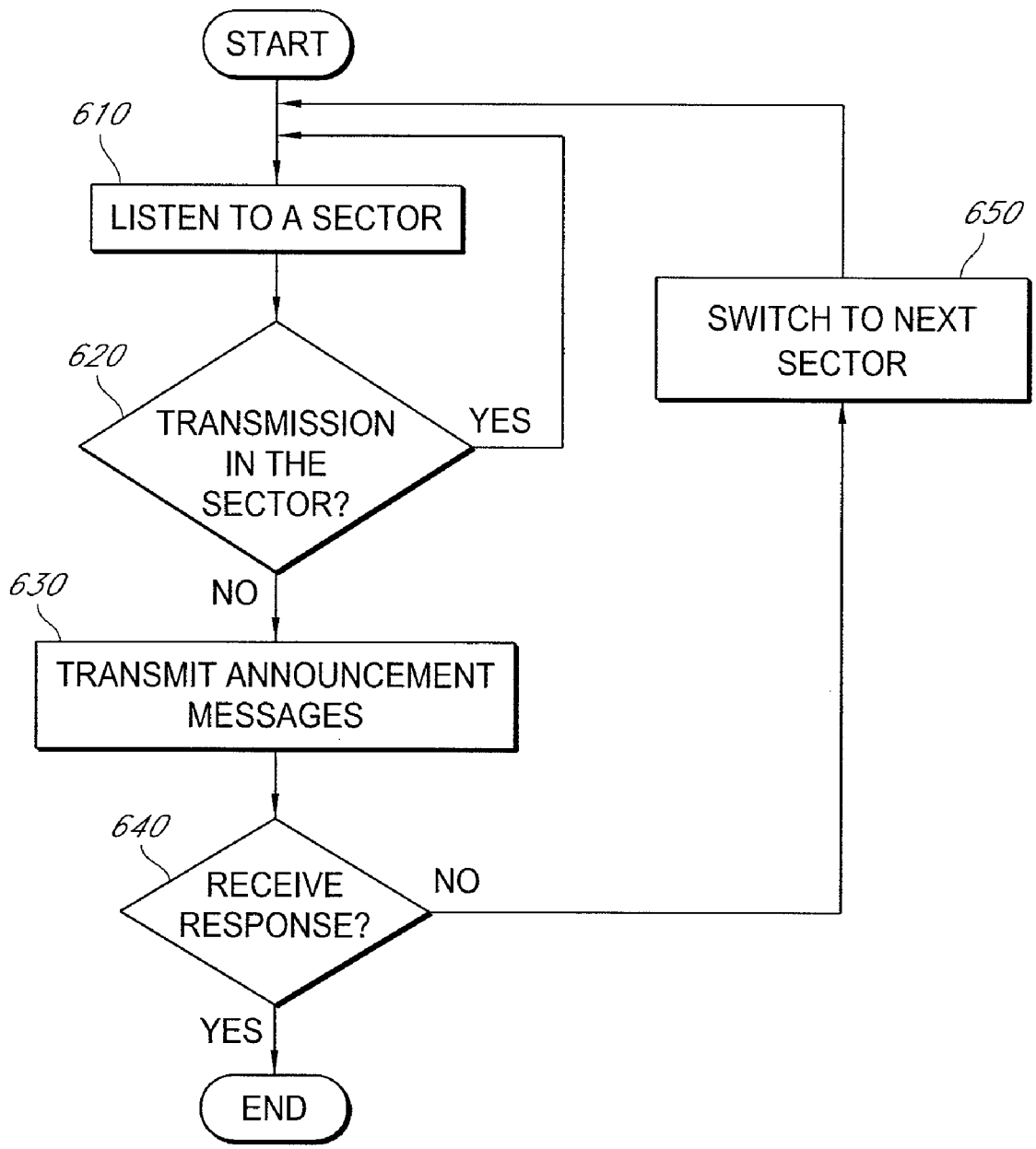
FIG. 6 is a flowchart illustrating a process for device discovery at a new device entering a wireless network according to one embodiment.

Referring to FIG. 6, one embodiment of a device discovery process performed by a new device will be described below. For example, the fourth device D of FIG. 4B may be such a new device, and the process shown in FIG. 6 may take place at the fourth device D. It will be appreciated that the process of FIG. 6 can be performed by any new device that attempts to join the network 400.

First, at block 610, the new device listens to one of its sectors. In one embodiment, the new device may listen to the one sector for a period T of time. The period T may be a duration for which the existing devices transmit a signal to one of its sectors in device discovery. In other embodiments, the period T may be any arbitrary time period selected by the new device.

At block 620, the new device determines whether it has received any signal in the sector during the period T. If yes, the process returns to block 610.

If no, the new device transmits one or more announcement messages to the sector at block 630. The announcement messages may include, for example, the name of the new device, the MAC address of the new device, a sector number used for transmitting the announcement messages, and/or the transmit power used by the new device.

At block 640, the new device determines whether it has received a response from the sector to which it has sent the announcement messages. If no, the new device switches to a next sector at block 650, and the above process is repeated. If yes, the process is terminated.

Figure 7:
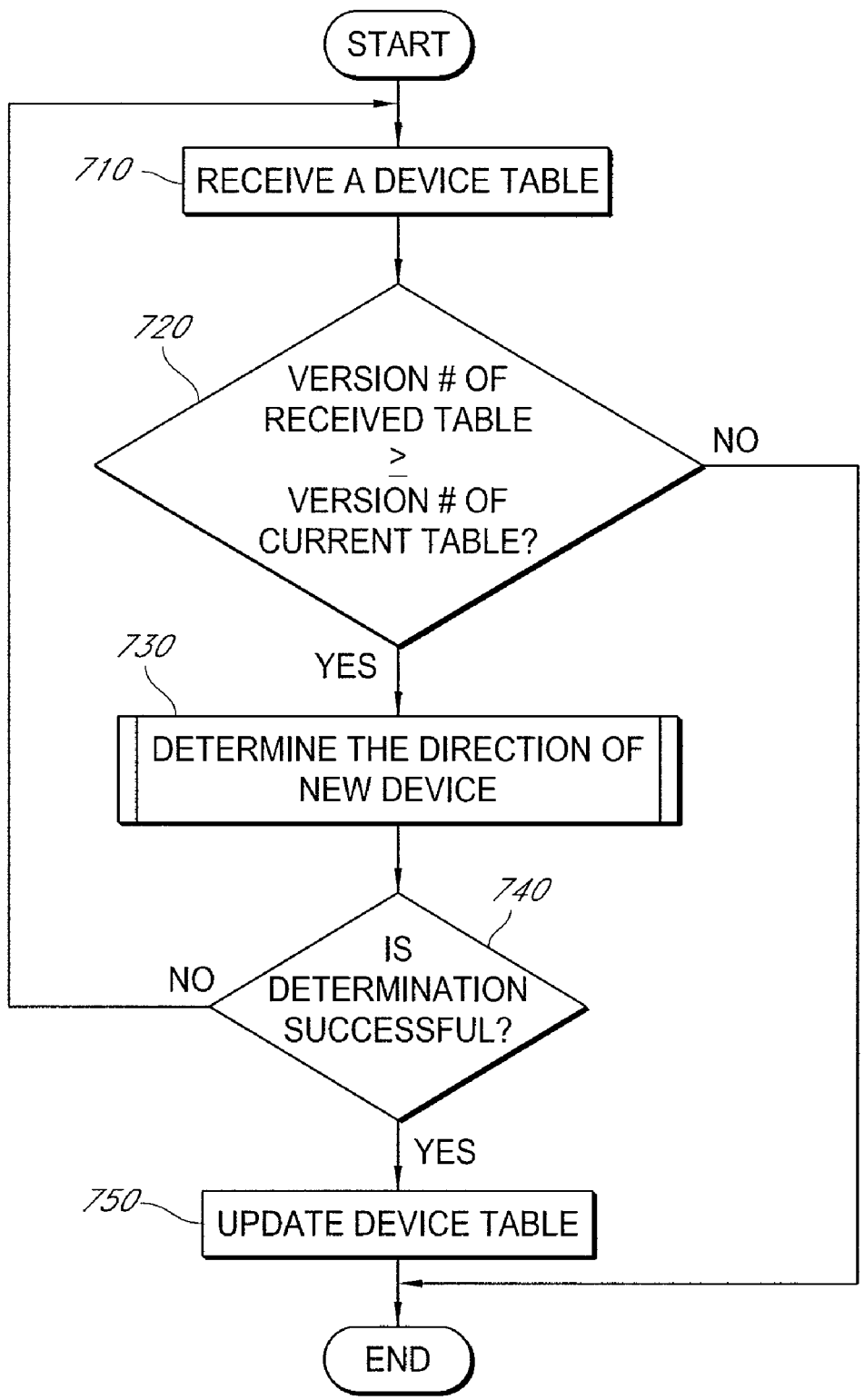
FIG. 7 is a flowchart illustrating a process for updating a device table at an existing device in a wireless network according to one embodiment.

Referring to FIG. 7, one embodiment of a process performed by an existing non-discovery device will be described below. For example, among the first to third devices A-C of FIG. 4B, the second and third devices B, C may be existing non-discovery devices, and the process shown in FIG. 7 may take place at one or more of the second and third devices B, C. In certain instances, an existing discovery device may also perform the process of FIG. 7 if it receives an updated device table from another existing discovery device.

First, at block 710, the existing non-discovery device receives a device table from an existing discovery device. For example, the received device table may be the updated device table transmitted at the block 550 of FIG. 5.

At block 720, the existing non-discovery device determines whether the version number of the received device table is "equal to or higher than" the current version number of the device table that the existing non-discovery device has (hereinafter, referred to as a "first version selection option"). If no, the existing non-discovery device may discard the received device table, and may terminate the process. If yes, the process goes to block 730 for further processing.

This allows the device tables of the devices to be consistent with one another. In certain instances, more than one existing devices may receive an announcement message from the new device at the same time, and may update and send their device tables to the other devices. For example, in FIG. 4B, the first device A and the second device B may simultaneously perform device discovery directly with the fourth device D. Then, the first and second devices A, B may send their updated device tables with an increased version number to all the other devices in the network 400. For example, if the version number before the fourth device D enters the network 400 is 0001, the device tables of the first and second devices can have the same new version number 0002.

If the third device C receives an updated device table from the first device A first and another updated device table from the second device B later, the third device C may update its own device table, based on the device table from the first device A, and increase its version number to 0002. Then, the third device C may subsequently perform the same process with the device table from the second device B. In this case, the third device C may further update its device table, using the device table from the second device B.

In another embodiment, at block 720, the existing non-discovery device determines whether the version number of the received device table is "equal to or higher" than the current version number of the device table that the existing non-discovery device has (hereinafter, referred to as a "second version selection option"). If no, the existing non-discovery device may discard the received device table, and may terminate the process. If yes, the process goes to block 730 for further processing. In this embodiment, when the third device C receives an updated device table from the first device A first and another updated device table from the second device B later, it updates its device table using the device table from the first device A, and the device table from the second device B if both of them have an equal or higher version number.

Referring back to FIG. 7, at block 730, the existing non-discovery device may determine the direction of the new device relative to the non-discovery device, using its current device table and the received device table. The details of the block 730 will be described below in connection with FIG. 8.

At block 740, the existing non-discovery device checks whether the determination of the direction of the new device has been successful. If no, the process returns to the block 710 and waits for another device table from another device. Alternatively, the non-discovery device may perform device discovery directly with the new device. If yes at the block 740, the existing non-discovery device may update its device table and increase the version number of the device table at block 750.

Figure 8:
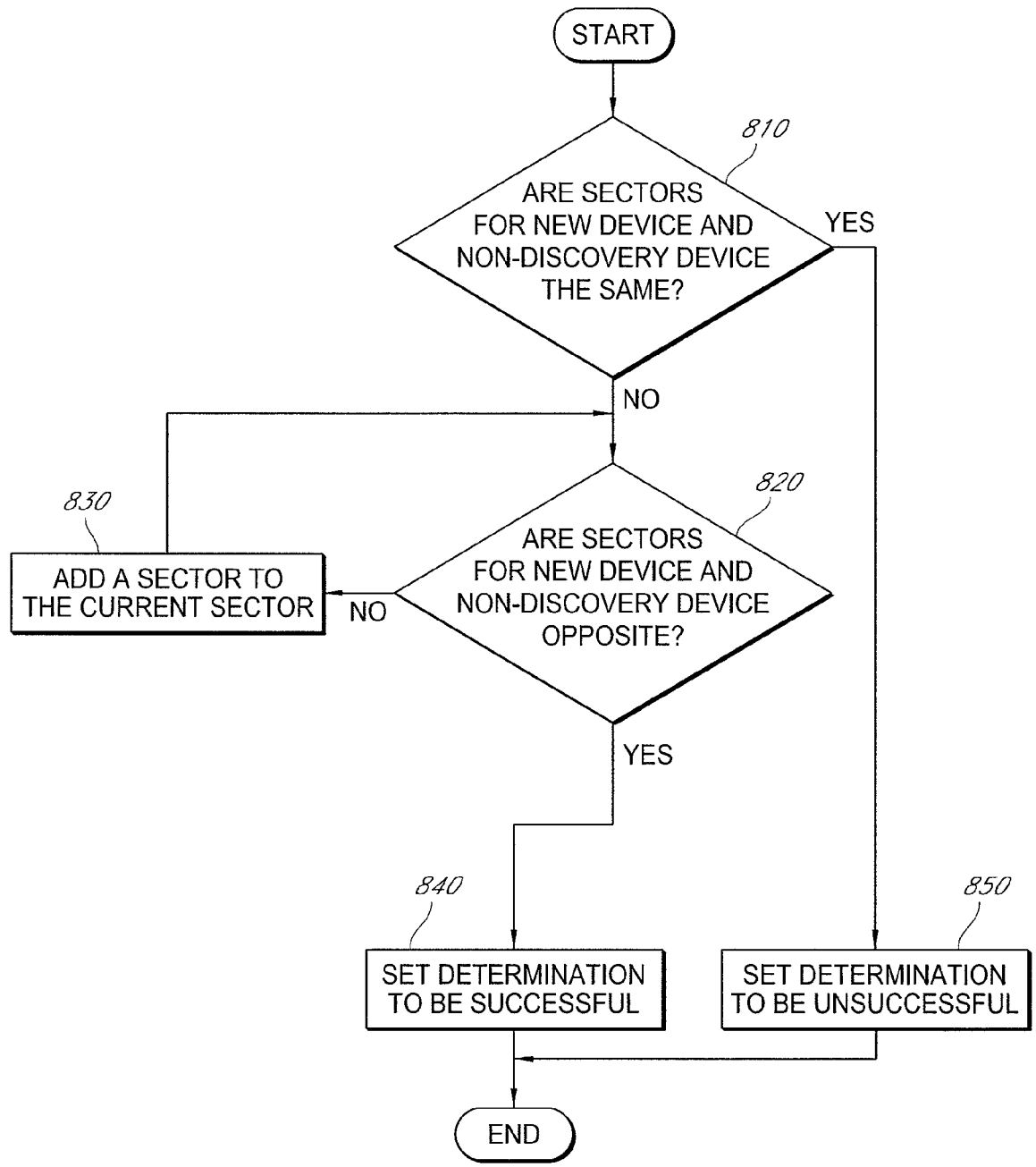
FIG. 8 is a flowchart illustrating a process of determining the direction of a new device, using a device table from another device, according to one embodiment.
Figure 9A:
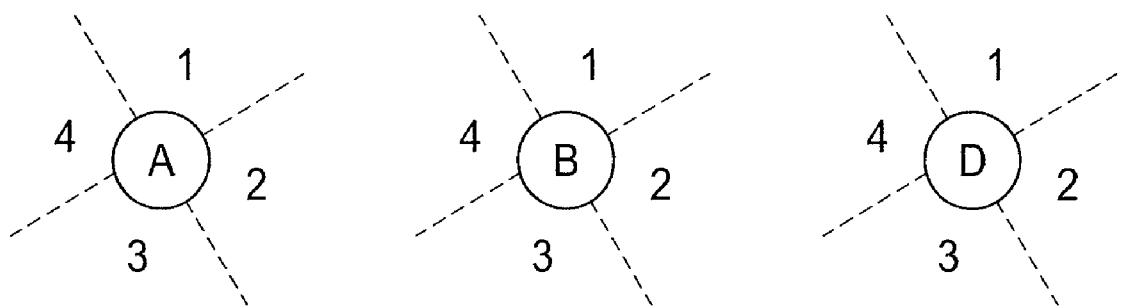
FIGS. 9A-9D are diagrams illustrating possible situations where a device table indicates that a new device is positioned in the same direction as the direction of a non-discovery device with respect to a discovery device generating the device table.
Figure 9B:
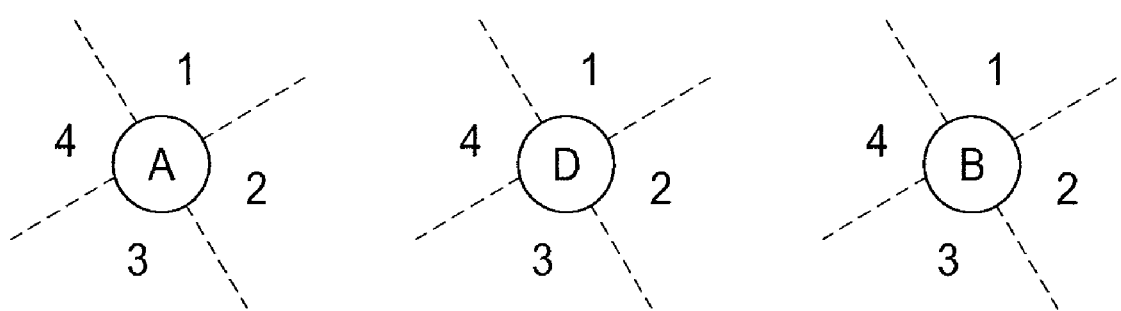
Figure 9C:
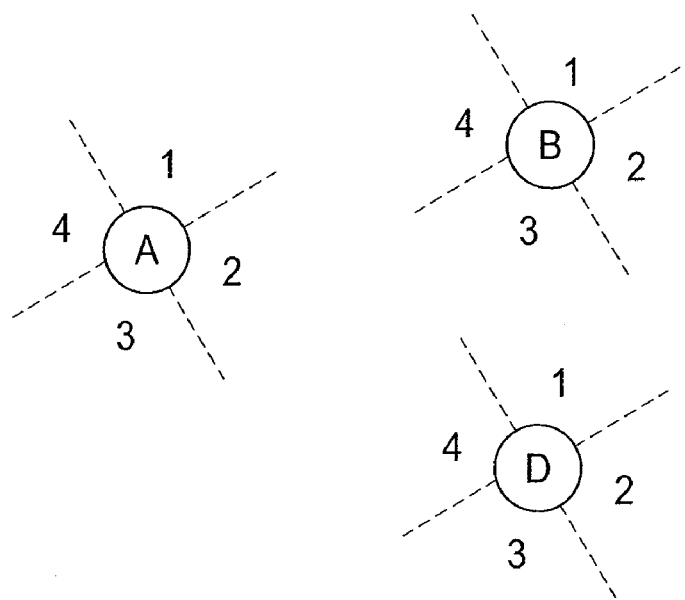
Figure 9D:
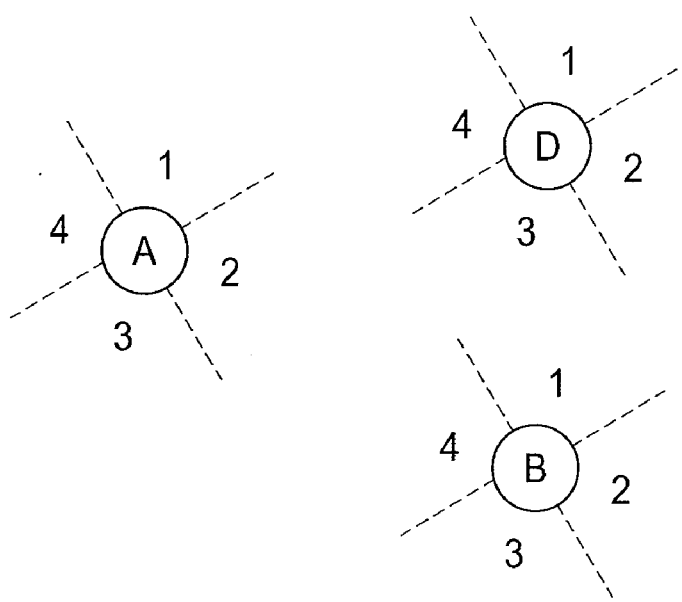

Referring to FIGS. 4B and 8, one embodiment of a process for determining the direction of a new device by an existing non-discovery device will be described below. For example, in FIG. 4B, the fourth device D is a new device. The first device A may be an existing discovery device, and the second device B may be an existing non-discovery device. The third device C may be another existing non-discovery device. In the following examples, the positions of the first to fourth devices A-D can differ from those shown in FIG. 4B. For example, the second device B can have a device table shown in Table 3.

TABLE 3

| Version Number | Device Name | Sector |
| --- | --- | --- |
| 0001 | A | 1 |
|  | B | 0 |
|  | C | 2 |

First, at block 810, the existing non-discovery device determines if the directions of the non-discovery device and the new device with respect to the discovery device are the same as each other. For example, when the second device B receives a device table shown in Table 4 from the first device A, the answer can be yes. Examples will be described below.

TABLE 4

| Version Number | Device Name | Sector |
| --- | --- | --- |
| 0002 | A | 0 |
|  | B | 4 |
|  | C | 3 |
|  | D | 4 |

Based on the device table from the first device A, possible relative positions of the first, second, and fourth devices A, B, D are shown in FIGS. 9A-9D. Because the exact position of the new device D cannot be determined as illustrated in FIGS. 9A-9D, the process goes to block 850, where the determination is set to be unsuccessful. If no at the block 810, the process goes to block 820.

At the block 820, the existing non-discovery device determines if the directions of the non-discovery device and the new device with respect to the discovery device are opposite from each other. For example, the second device B can receive a device table shown in Table 5 from the first device A. Possible positions of the first, second, and fourth devices A, B, D are shown in FIG. 10A.

TABLE 5

| Version Number | Device Name | Sector |
| --- | --- | --- |
| 0002 | A | 0 |
|  | B | 4 |
|  | C | 3 |
|  | D | 2 |

Figure 10A:
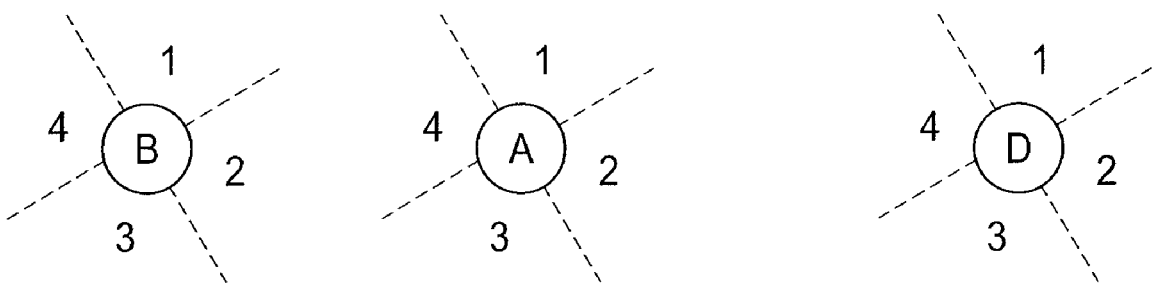
FIG. 10A is a diagram illustrating a situation where a device table indicates that a new device is positioned opposite from a non-discovery device with respect to a discovery device generating the device table.

Because each of the devices A, B, D in FIG. 10A has four sectors, when the sectors of the second and fourth devices B, D are 4 and 2, respectively, the second and fourth devices B, D are positioned opposite from each other with respect to the first device A. In this instance, it can be determined that the direction of the fourth device D with respect to the second device B is 2, which indicates that the fourth device D is in the same sector as the first device A.

If the directions of the non-discovery device and the new device with respect to the discovery device are opposite from each other at block 820 (if yes), the non-discovery device can set the determination to be successful at block 840. Then, at block 750 of FIG. 7, the second device B can update its device table, for example, as shown in Table 6.

TABLE 6

| Version Number | Device Name | Sector |
| --- | --- | --- |
| 0002 | A | 2 |
|  | B | 0 |
|  | C | 3 |
|  | D | 2 |

Figure 10B:
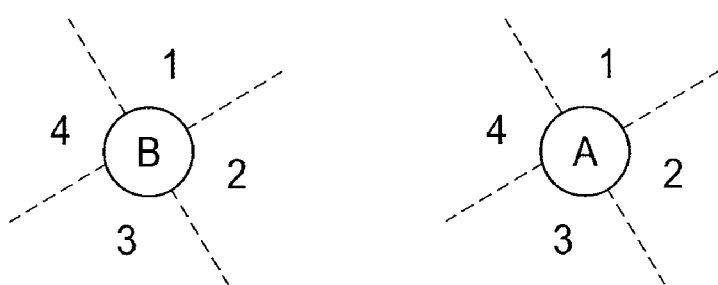
FIG. 10B is a diagram illustrating a possible situation when a device table indicates that a new device is positioned in a direction substantially perpendicular to the direction of a non-discovery device with respect to a discovery device generating the device table.
Figure 10B:
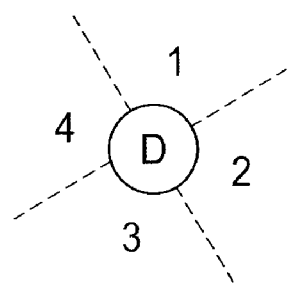

If the directions of the non-discovery device and the new device with respect to the discovery device are not opposite from each other at block 820 (if no), the process goes to block 830. For example, the second device B can receive a device table shown in Table 7 from the first device A. Possible relative positions of the first, second, and fourth devices are shown in FIG. 10B.

TABLE 7

| Version Number | Device Name | Sector |
|---|---|---|
| 0002 | A | 0 |
|  | B | 4 |
|  | C | 3 |
|  | D | 3 |

In this instance, the non-discovery device may have two or more sectors for the new device, as shown in Table 8. The details of adding sectors for the new device will be described below in connection with FIGS. 11A and 11B. Then, the process returns to the block 820. If yes at the block 820, the determination can be set to be successful at block 840. Subsequently, at block 750 of FIG. 7, the second device B can update its device table, as shown in Table 8. In certain embodiments, the device table of the second device B can be further updated to determine the exact direction of the fourth device D, using another device table from another device. Alternatively, the exact direction of the fourth device D can be determined when communicating directly with the fourth device D.

TABLE 8

| Version Number | Device Name | Sector |
|---|---|---|
| 0002 | A | 2 |
|  | B | 0 |
|  | C | 3 |
|  | D | 2 and 3 |

Figure 11A:
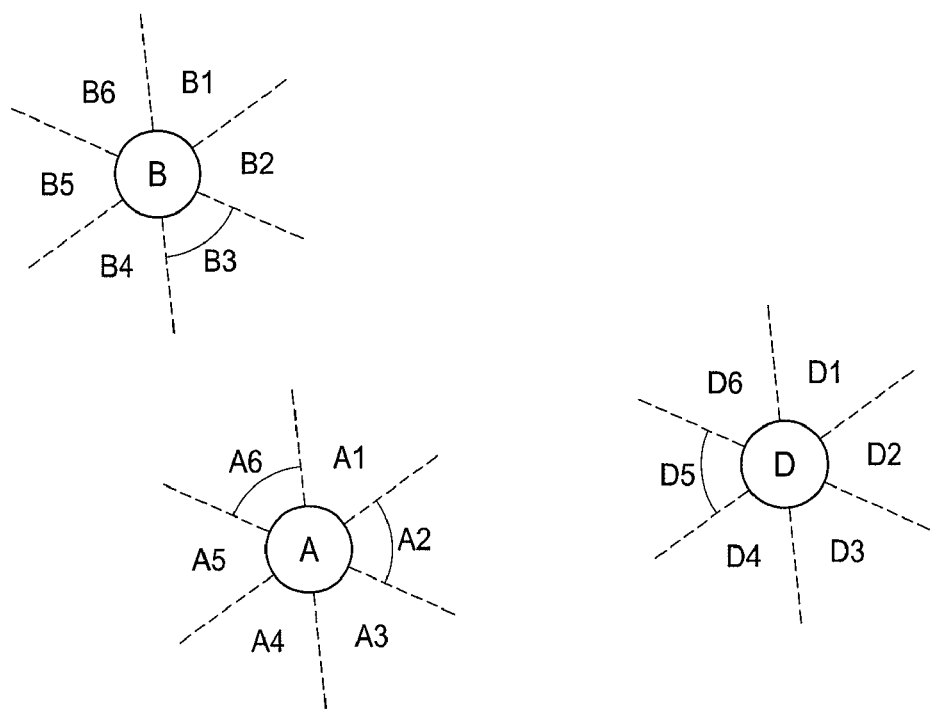
FIGS. 11A and 11B are diagrams illustrating the block 820 of FIG. 8 according to one embodiment.
Figure 11B:
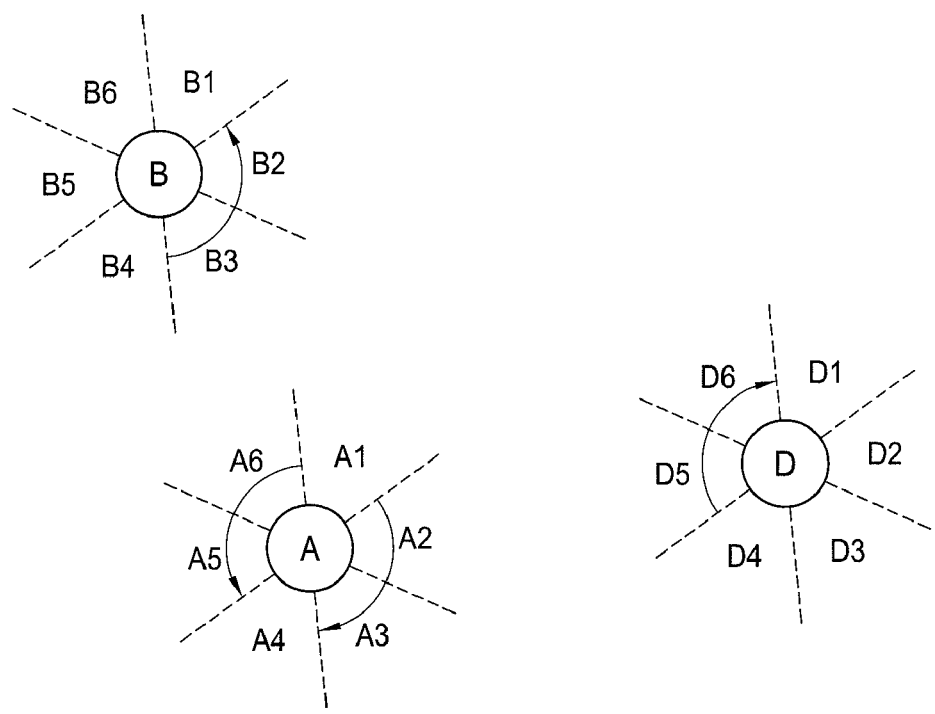

Referring to FIGS. 11A and 11B, one embodiment of a process of adding one or more sectors for a new device at the block 830 of FIG. 8 will be described below. In FIGS. 11A and 11B, each of first, second, and fourth wireless devices A, B, D has first to sixth sectors. In other embodiments, one or more of the devices A, B, D can have a different number of sectors. In the illustrated example, the fourth device D may be a new device. The first device A may be an existing discovery device, and the second device B may be an existing non-discovery device.

In FIG. 11A, the second device B is positioned in the sixth sector A6 of the first device A. The first device A is positioned in the third sector B3 of the second device B. The fourth device D is positioned in the second sector A2 of the first device A. Because each of the devices A, B, D has six sectors, the sectors A6, A2 including the second and fourth devices B, D, respectively, indicate that the devices B, D are positioned neither opposite from each other nor in the same direction as each other.

In this instance, sectors adjacent to the current sectors A6, A2 are added to the current sectors A6, A2 such that the resulting combinations of the sectors of the discovery device are positioned opposite from each other. For example, the fifth sector A5 and the third sector A3 can be added to the current sectors A6, A2. A first combination of the fifth and sixth sectors A5, A6 are opposite from a second combination of the second and third sectors A2, A3. The added sectors may be selected such that a minimum number of sectors are added to the current sectors.

In the illustrated example, the fifth sector A5 of the first device A is in a counter-clockwise direction from the sixth sector A6 of the first device A. A sector of the second device B is added to the current sector of the second device B in the same manner. That is, a second sector B2 in a counter-clockwise direction from the current third sector B3 is added to the second device B. Thus, a combination of the second and third sectors B2, B3 of the second device B faces the combination of the fifth and sixth sectors A5, A6 of the first device A.

The third sector A3 of the first device A that is being added is in a clockwise direction from the second sector A2 of the first device A. A sector of the fourth device D is added to the current sector of the fourth device D in the same manner. That is, a sixth sector D6 in a counter-clockwise direction from the fifth sector D5 is added for the fourth device D. Thus, a combination of the fifth and sixth sectors D5, D6 of the fourth device D faces the combination of the second and third sectors A2, A3 of the first device A.

In updating the device table of the second device B, the combination of the second and third sectors B2, B3 is assigned as the sectors for the new device, the fourth device D. In certain embodiments, an exact one sector may be determined using another device table from another existing device. Alternatively, the exact sector may be determined when the second device B communicates directly with the fourth device D by sending signals to either of the two sectors B2, B3.

In the embodiment described in connection with FIGS. 7 and 8, all of the existing devices in the network do not have to perform device discovery directly with a new device. Only one or a few of the existing devices may have to perform device discovery with the new device. The other existing devices in the network may update their own device tables using one or more updated device tables from a device that has performed device discovery.

The embodiments described above are described in the context of an ad-hoc network. In another embodiment, an infrastructure network may use a scheme similar to the scheme described above. In one embodiment, the infrastructure network is a Wireless Personal Area Network (WPAN) that complies with IEEE 802.15.3 standards.

In such an embodiment, the WPAN may include wireless devices and a piconet coordinator (PNC). The piconet coordinator serves to manage the network. To support an ad-hoc topology, the multi-band OFDM Alliance (MBOA) has standardized a multi-beacon MAC scheme. Based on the MBOA MAC structure, an automatic device discovery system can be designed for devices with directional antennas.

Figure 12:
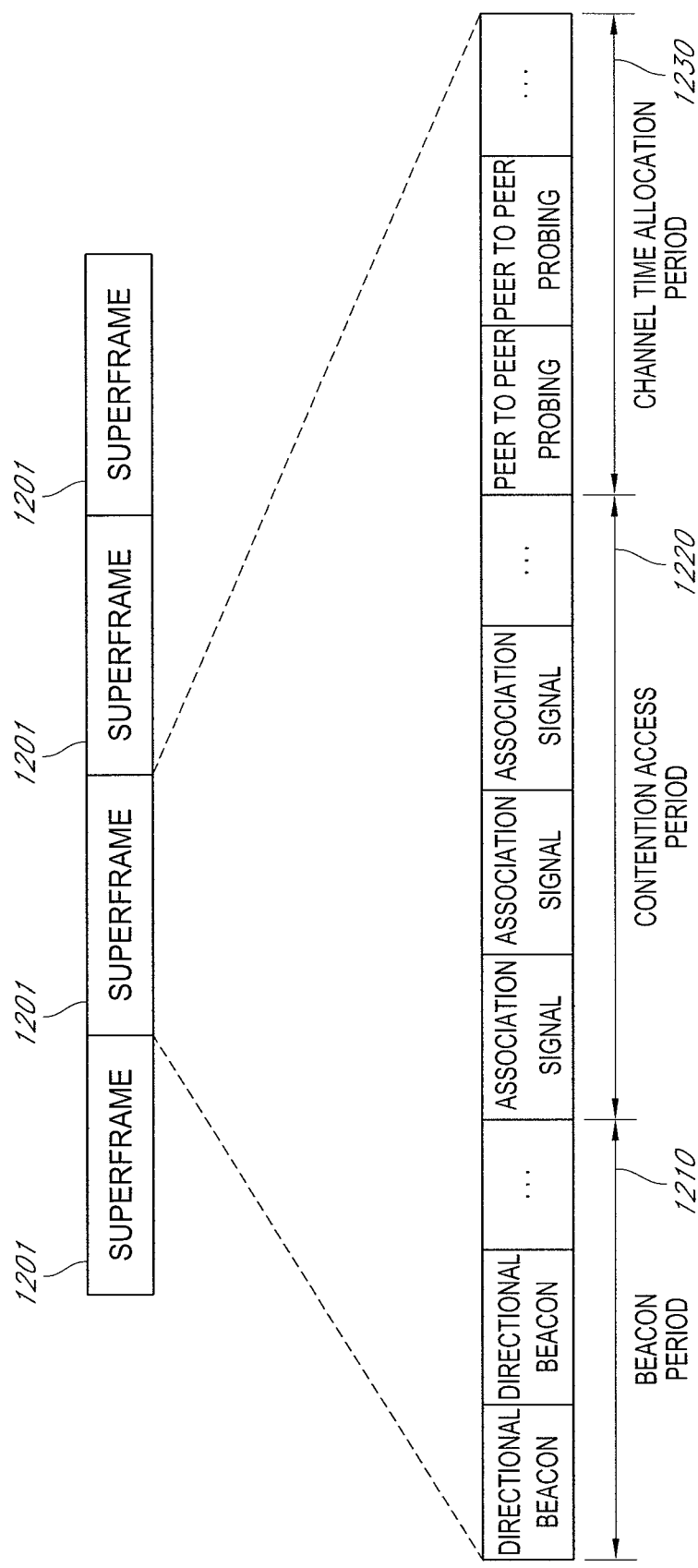
FIG. 12 is a timeline for device discovery for an infrastructure system according to one embodiment.

Referring to FIG. 12, one embodiment of a time frame for a WPAN using a cooperative device discovery scheme will be described below. The time frame includes a plurality of succeeding superframes 1201. Each of the superframes 1201 includes a beacon period 1210, a contention access period 1220, and a channel time allocation period 1230. During the beacon period 1210, wireless devices in the network may send beacon signals. During the contention access period 1220, the wireless devices can send association signals to the coordinator during respective association signal periods. During the channel time allocation period 1230, the wireless devices can communicate with one another during allocated channel time periods.

When a new device enters the network, the new device listens to the beacon signals. If the new device finds a beacon signal, the new device may attempt to associate with the existing device that has sent out the beacon signal. This association step can be performed during the contention access period 1220.

If the new device does not find a beacon signal, it sends out beacon signals in different directions. If any of the existing devices receives the beacon signal from the new device, it updates the device table. Then, the existing device sends the new device a response. The updated device table is broadcast to all the other devices. After receiving the updated device table, the other devices calculate the direction of the new device, and update their device tables.

The devices may reserve time during the channel time allocation period 1230 for peer-to-peer probing in order to set up a direct link. During device discovery, the devices may not have the exact directional information based on the device tables from other devices. Further scanning may be performed during the reserved time for the peer-to-peer probing. During the scanning, the new device may transmit probing messages in all possible directions and the other devices may rotate at a slower speed in all possible directions. If there is an estimation error and no probing messages are received after one round, both devices may enlarge the scope of the scanning, for example, including adjacent two sectors, one at each side, and conduct the scanning again, until they find each other.

The embodiments above are described in the context where all the wireless devices have directional antennas. In other embodiments, at least one, but not all, of the wireless devices can have an omni-directional antenna, instead of a directional antenna. In certain embodiments, all the wireless devices can have omni-directional antennas. In some embodiments, at least one of the wireless devices can have both directional and omni-directional antennas.

In the embodiments described above, when communicating with a new device, most of the existing devices in a wireless network can use device tables to locate the new device. Thus, it takes less time for the devices to locate a new device than in a conventional scheme where individual existing devices in a network perform device discovery directly with a new device.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of device discovery for a wireless network including a plurality of wireless devices, the method comprising:
   determining, by a first wireless device in the wireless network, a direction of a second wireless device with respect to the first wireless device;
   determining a direction of a third wireless device in the wireless network with respect to the second wireless device;
   updating, by the first wireless device, a first device table with the determined direction of the second wireless device, the first device table containing a list of the wireless devices in the wireless network and directions of the wireless devices with respect to the first wireless device; and
   transmitting, by the first wireless device, the updated first device table over the wireless network;
   wherein each of the first to third wireless devices comprises an antenna including a plurality of sectors, the first device table indicates that the second wireless device is positioned in a first sector of the first wireless device, and that the third wireless device is positioned in a second sector of the first wireless device, and
   wherein determining the direction of the third wireless device in the wireless network with respect to the second wireless device is based on determining if the first sector is in an opposite direction to the second sector.

2. The method of claim 1, wherein the second wireless device is a wireless device newly entering the wireless network.

3. The method of claim 1, wherein the second wireless device is a wireless device pre-existing in the wireless network.

4. The method of claim 1, wherein each of the first to third wireless devices comprises a directional antenna.

5. The method of claim 4, wherein each directional antenna comprises at least one of a sector antenna or a beamforming antenna.

6. The method of claim 1, wherein the second wireless device comprises a directional antenna including a first plurality of sectors, wherein the method further comprises:
   listening, by the second wireless device, to one sector of the first plurality of sectors to determine if there is a signal transmission in the one sector; and
   transmitting an announcement signal to the one sector if there is no signal received in the one sector.

7. The method of claim 6, wherein the first wireless device comprises a directional antenna including a second plurality of sectors, wherein determining the direction of the second wireless device comprises listening, by the first wireless device, to one sector of the second plurality of sectors to receive the announcement signal from the second wireless device.

8. The method of claim 7, further comprising transmitting an announcement response to the second wireless device if there is an announcement signal received by the first wireless device.

9. The method of claim 1, further comprising:
   receiving, by the third wireless device in the wireless network, the updated first device table from the first wireless device, the updated first device table including directions of the second and third wireless devices with respect to the first device; and
   updating, by the third wireless device, a second device table, based at least partly on the updated first device table, the second device table containing a list of the wireless devices in the wireless network and directions of the wireless devices with respect to the third wireless device.

10. The method of claim 9, wherein each of the first and second device tables includes a version number, and wherein the method further comprises: determining if the version number of the first device table is equal to or higher than the version number of the second device table.

11. The method of claim 9, further comprising determining, by the third wireless device, a direction of the second device with respect to the third device, based at least partly on the directions of the second and third wireless devices with respect to the first device.

12. The method of claim 1, wherein an estimation of a location of the third wireless device is that the third wireless device is located in the same direction as the second sector of the first wireless device if the first sector is in the opposite direction to the second sector.

13. A method of operation of a wireless network including a plurality of wireless devices, the method comprising:
   receiving, by a second wireless device in the wireless network, a first device table generated by a first wireless device in the wireless network, the first device table containing a list of the wireless devices in the wireless network and directions of the wireless devices with respect to the first wireless device;
   updating, by the second wireless device, a second device table, based at least partly on the first device table, the second device table containing a list of the wireless devices in the wireless network and directions of the wireless devices with respect to the second wireless device; and determining a direction of a third wireless device in the wireless network with respect to the second wireless device, wherein each of the first to third wireless devices comprises an antenna including a plurality of sectors, wherein the first device table indicates that the second wireless device is positioned in a first sector of the first wireless device, and that the third wireless device is positioned in a second sector of the first wireless device.

14. The method of claim 13, wherein each of the first and second device tables includes a version number, wherein the method further comprises determining if the version number of the first device table is equal to or higher than the version number of the second device table.

15. The method of claim 13, wherein determining the direction of a third wireless device in the wireless network with respect to the second wireless device is based at least partly on directions of the second and third wireless devices with respect to the first wireless device.

16. The method of claim 15, wherein each of the first to third wireless devices comprises a sector antenna including a plurality of sectors;

wherein determining the direction of the third wireless device with respect to the second wireless device comprises determining if the first sector is in the opposite direction to the second sector; and wherein an estimation of a location of the third wireless device is that the third wireless device is located in the same direction as the second sector of the first wireless device if the first sector is in the opposite direction to the second sector.

17. The method of claim 16, wherein determining the direction of the third wireless device with respect to the second wireless device further comprises:

determining if the first sector is not opposite to the second sector; and combining the first sector with a third sector of the first wireless device, and the second sector with a fourth sector of the first wireless device, such that a first combination of the first and third sectors is opposite to a second combination of the second and fourth sectors; and wherein an estimation of the location of the third wireless device is that the third wireless device is located in the same direction as the second combination of the second and fourth sectors of the first wireless device.

18. A first wireless device for use in a wireless network, the first wireless device comprising:

a first device table including a list of wireless devices in a wireless network, and directions of the wireless devices in the wireless network with respect to the first wireless device;

wherein the first wireless device determines the direction of a second wireless device with respect to the first wireless device;

wherein the first wireless device determines a direction of a third wireless device in the wireless network with respect to the second wireless device;

wherein the first wireless device updates the first device table with the determined direction of the second wireless device;

wherein the first wireless device transmits the updated first device table to at least one of the wireless devices in the wireless network, wherein each of the first to third wireless devices comprises an antenna including a plurality of sectors, wherein the first device table indicates that the second wireless device is positioned in a first sector of the first wireless device, wherein the third wireless device is positioned in a second sector of the first wireless device, and wherein the first wireless device receives a second device table from the third wireless device, the second device table including a list of the wireless devices in the wireless network and directions of the wireless devices in the wireless network with respect to the third wireless device, and updates the first device table, based at least partially on the second device table.

19. The device of claim 18, wherein the second wireless device is a wireless device newly entering the wireless network.

20. The device of claim 18, wherein the second wireless device is a wireless device pre-existing in the wireless network.

21. The device of claim 18, wherein each antenna comprises a directional antenna, wherein the first wireless device determines the direction of the second wireless device using the directional antenna.

22. The device of claim 21, wherein each directional antenna comprises at least one of a sector antenna or a beamforming antenna.

23. The device of claim 18, wherein the list includes a name and/or ID of at least one of the wireless devices in the wireless network.

24. The device of claim 18, wherein the first wireless device listens to one sector of the plurality of sectors to determine if there is a signal transmission in the one sector; and transmits an announcement signal to the one sector if there is no signal received in the one sector.

25. The device of claim 24, wherein the first wireless device is further configured to listen to one sector of the plurality of sectors to receive an announcement signal from the second wireless device.

26. The device of claim 25, wherein the first wireless device is further configured to transmit an announcement response to the second wireless device if it receives an announcement signal from the second wireless device.

27. The device of claim 18, wherein each of the first device table and the second device table includes a version number, and wherein the first wireless device determines if the version number of the first device table is equal to or higher than the version number of the second device table.

28. The device of claim 18, wherein the first wireless device determines the direction of the second wireless device with respect to the first wireless device, based at least partly on directions of the second wireless device and the first wireless device with respect to the third wireless device.

29. A first wireless device for use in a wireless network, the device comprising:

a first device table including a list of wireless devices in a wireless network, and directions of the wireless devices in the wireless network with respect to the first wireless device;

wherein the first wireless device receives a second device table from a second wireless device, the second device table including a list of the wireless devices in the wireless network and the directions of the wireless devices in the wireless network with respect to the second wireless device, and wherein the first wireless device updates the first device table, based at least partially on the second device table, wherein the first wireless device determines a direction of a third wireless device in the wireless network with respect to the second wireless device, wherein each of the first to third wireless devices comprises an antenna including a plurality of sectors, wherein the first device table indicates that the second wireless device is positioned in a first sector of the first wireless device, and that the third wireless device is positioned in a second sector of the first wireless device; and wherein the first wireless device determines the direction of the third wireless device based on determining if the first sector is in an opposite direction to the second sector.

30. A wireless communication system comprising:
a plurality of wireless devices forming a wireless network, the plurality of wireless devices wirelessly communicate with one another, each of the wireless devices including a device table including a list of one or more of the wireless devices and directions of the one or more of the wireless devices with respect to a wireless device including the device table, wherein any one of the plurality of wireless devices performs device discovery directly with a new wireless device entering the wireless network, wherein a first wireless device updates the device table therein and transmits the updated device table to other wireless devices in the wireless network, wherein a first device table indicates that the first wireless device is positioned in a first sector of a second wireless device, and that a third wireless device is positioned in a second sector of the first wireless device, and wherein the first device determines the direction of the third wireless device based on determining if the first sector is in an opposite direction to the second sector.

31. The system of claim 30, wherein at least one of the other wireless devices in the wireless network updates a device table therein, based at least partly on the updated device table transmitted by the first wireless device.

32. The system of claim 30, wherein the wireless network comprises an ad-hoc network.

33. The system of claim 30, wherein the wireless network comprises an infrastructure network.

34. The system of claim 33, wherein the one wireless device performs device discovery directly with the new device, using beacon signals.

35. A method of device discovery for a wireless network including a plurality of wireless devices, the method comprising:
determining, by a first wireless device in the wireless network, a direction of a second wireless device with respect to the first wireless device, wherein a first device table indicates that the second wireless device is positioned in a first sector of the first wireless device, and that a third wireless device is positioned in a second sector of the first wireless device;

determining a direction of a third wireless device in the wireless network with respect to the second wireless device based on determining if the first sector is in an opposite direction to the second sector; and updating, by the first wireless device, the first device table with the determined direction of the second wireless device, the first device table containing a list of the wireless devices in the wireless network and directions of the wireless devices with respect to the first wireless device.

36. A method of operation of a wireless network including a plurality of wireless devices, the method comprising:
receiving, by a second wireless device in the wireless network, a first device table generated by a first wireless device in the wireless network, the first device table containing a list of the wireless devices in the wireless network and directions of the wireless devices with respect to the first wireless device;

updating, by the second wireless device, a second device table, based at least partly on the first device table, the second device table containing a list of the wireless devices in the wireless network and directions of the wireless devices with respect to the second wireless device; and determining a direction of a third wireless device in the wireless network with respect to the second wireless device based on determining if a first sector is in an opposite direction to a second sector.

* * * * *